United States Patent [19]

Rhodes

[11] Patent Number: 4,621,447
[45] Date of Patent: Nov. 11, 1986

[54] FISHING APPARATUS WITH ILLUMINATED BAIT

[76] Inventor: James A. Rhodes, 42 E. Gay St., Ste. 1300, Columbus, Ohio 43215

[21] Appl. No.: 720,322

[22] Filed: Apr. 5, 1985

[51] Int. Cl.$^4$ ............................................. A01K 85/01
[52] U.S. Cl. ..................................... 43/17.5; 43/17.6; 43/18.1
[58] Field of Search ..................... 43/17.5, 17.6, 18.1, 43/18.5

[56] References Cited

U.S. PATENT DOCUMENTS

| | | | |
|---|---|---|---|
| 1,190,872 | 7/1916 | Dildine | 43/17.5 |
| 1,448,120 | 3/1923 | Johnson | 43/17.5 |
| 2,431,420 | 11/1947 | Pope | 43/17.5 |
| 2,655,757 | 10/1953 | Boyce | 43/20 |
| 3,045,381 | 7/1962 | Martin | 43/17.6 |
| 3,693,278 | 9/1972 | Mahone | 43/17.5 |
| 3,918,190 | 11/1975 | Hornbeck | 43/17.6 |
| 3,935,659 | 2/1976 | McCallum | 43/17.6 |

FOREIGN PATENT DOCUMENTS 604050  4/1960  Italy .................................... 43/17.6

OTHER PUBLICATIONS

Disclosure Document No. 173,428 Forest Earl Dildine Nov. 28, 1916.

Primary Examiner—Gene P. Crosby
Attorney, Agent, or Firm—Beveridge, De Grandi & Weilacher

[57] ABSTRACT

A fishing apparatus including a light source for illuminating the bait while not scaring fish. Batteries within the handle of a fishing rod are connected by electrically conductive fishing line to a light source positioned to shine onto the bait within the water. In one embodiment, the light source emits ultraviolet light and the bait exhibits fluorescence so that the bait is visible to fish while light from the ultraviolet source is not. In another embodiment, a switch on the handle of the rod permits the light source to be shut off and the bait is phosphorescent so that the light source shines onto the bait and then is shut off and the bait continues to be visible. If desired, a second light source can be positioned in a float to enable locating the bait.

3 Claims, 3 Drawing Figures

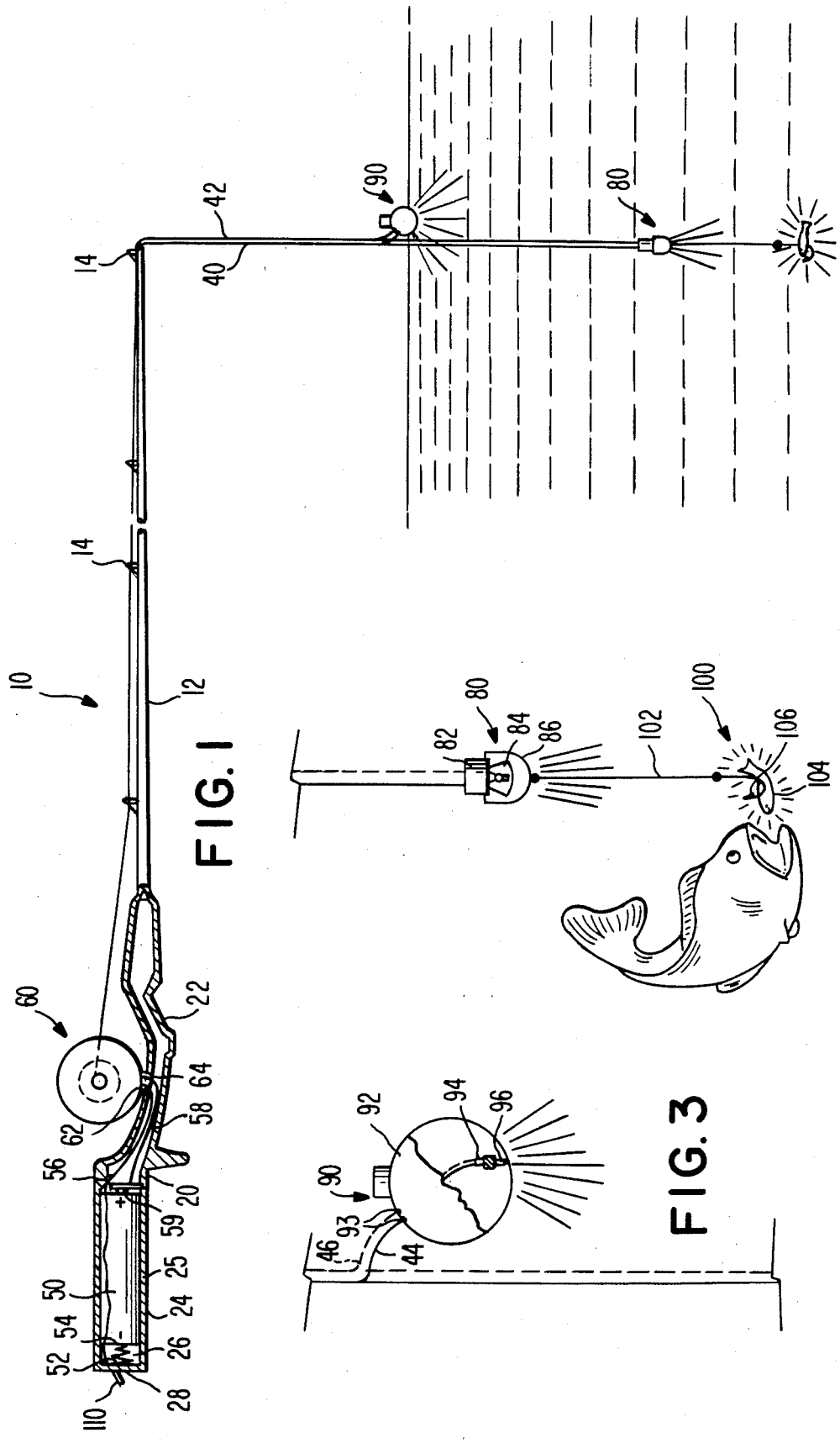

tus in accordance with one preferred embodiment of the present invention, showing light sources disposed in a body of water;

FISHING APPARATUS WITH ILLUMINATED BAIT

BACKGROUND OF THE INVENTION

The present invention pertains to fishing apparatus. More particularly, the present invention pertains to a fishing apparatus which is provided with one or more light sources directed so that the hook and, possibly, the bait of the fishing apparatus either fluoresce or phosphoresce when exposed to light from the sources. These light sources also enable the fisherman to identify the area in which the hook and bait are positioned, with substantial precision.

Fishing rods are known with one or more batteries in their handle to provide electrical power through conductors, which also serve as the fishing line, to a light. Such prior art devices include, for example, that shown in U.S. Pat. No. 1,190,872 to Dildine, which discloses a flotation device including a lamp. Conductors, serving as the fishing line, provide the lamp with power to illuminate and thereby identify with substantial precision the area below which the baited hook is suspended. However, the light from such a lamp, positioned above the water surface, may startle and frighten off some fish and thereby hinder, rather than enhance, fishing.

U.S. Pat. No. 3,693,278 to Mahone provides one approach to the latter problem by disclosure of a specially configured, illuminated bobber. In Mahone's disclosure, the bobber itself contains a lamp, the light of which is visible to the fisherman through a translucent upper hemisphere but is hidden from fish below the surface by an opaque lower hemisphere. A tube member, terminating in a second lamp, extends radially from the opaque lower hemisphere to illuminate a baited hook, suspended below, with visible light. The Mahone device, although preventing light from the surface from penetrating the water, and although illuminating the bait, still is likely to frighten off many fish. The bright light from the second lamp, as well as the light beam passing from that lamp to the bait and hook, are visible to fish. Although some fish might be attracted by the subsurface light, a number of species are likely to be frightened away from the bait area.

SUMMARY OF THE INVENTION

The present invention is a fishing apparatus overcoming these shortcomings of the prior art. In general, in a fishing apparatus in accordance with the present invention, the handle of the apparatus houses batteries connected by insulated conductors, which also serve as the fishing line and which are carried by the reel, to a first light source suspended from the conductor pair to cause luminescence in a bait member depending below, the bait member being composed of either fluorescent or phosphorescent material. Preferably this first light source emits non-visible light such as ultra-violet light, to cause luminescence of the fluorescent bait member while avoiding scaring the fish. Alternatively, the bait member can be phosphorescent, with the light source switched off at the desired time, while leaving the bait member visible. If desired, a second light source can be provided within a bobber connected to the conductor pair. This second light source illuminates and thereby identifies the area beneath which the hook and bait are positioned.

BRIEF DESCRIPTION OF THE DRAWINGS

These and other aspects and advantages of the present invention are more apparent from the following detailed description and claims, particularly when considered in conjunction with the accompanying drawings in which like parts bear like reference numbers. In the drawings:

FIG. 1 is a side elevational view of the fishing apparatus in accordance with one preferred embodiment of the present invention, showing light sources disposed in a body of water;

FIG. 2 is a diagrammatic perspective view of an embodimen of the first light source illuminating the bait in accordance with the present invention; and FIG. 3 is a diagrammatic perspective view of an embodiment of the second light source within a bobber in accordance with the present invention.

DETAILED DESCRIPTION OF A PREFERRED EMBODIMENT

As depicted in FIG. 1, fishing apparatus 10 includes a conventional rod 12 equipped with retaining eyelets 14, and handle assembly 20, including arm section 22 which detachably receives a reel 60. Tubular butt end 24 of handle assembly 20 extends away from arm section 22 and provides a gripping portion 25 for the fisherman. Bore 26 within butt end 24, receives battery 50 for providing electrical power to fishing apparatus 10. Rear contact 52 engages negative terminal 54 of battery 50 to provide electrical contact therewith. Rear contact 52 may consist of, for example, a spring extending from the end portion 28 of butt 24 to make conductive contact with terminal 54. Lead 56 electrically contacts and thereby connects terminal 54 with a negative contact point 62 on reel 60. Positive battery terminal 59 is positioned at the interior end of bore 26 to contact the positive terminal of battery 50. Electrical lead 58 electrically connects terminal 59 with positive contact point 64 of reel 60.

Reel 60 may be of any type known to the art which is specially adapted for use with conductive wires as fishing line. An example of such a reel is shown, for example, in Boyce U.S. Pat. No. 2,655,757, issued Oct. 20, 1953, the disclosure of which is incorporated herein by reference.

Insulated conductors 40 and 42 are chosen for their flexibility such that conductors 40 and 42 can serve as conduits for electrical power while also comprising the fishing line. Electrical power from battery 50 passes through conductors 40 and 42 to bait illuminator assembly 80 and, if desired, bobber lamp assembly 90.

Insulated conductors 40 and 42 terminate in a first electrical loop at bait illuminator assembly 80, depicted in FIG. 2. Conductors 40 and 42 are received by insulating socket 82 which protects the terminating ends of the conductors from exposure to water, for example with an epoxy glue seal. Lamp 84 engages socket 82 to complete the circuit and thereby form the second loop. Translucent cover 86 engages socket 82 to form a water-tight seal enveloping lamp 84. The entire bait illuminator assembly also may be coated with translucent epoxy to provide added security against exposure of any of the conducting parts to water.

Fish hook assembly 100 is suspended beneath bait illuminator assembly 80 by a preselected length of rigid fishing line 102. Fish hook assembly 100 includes a flexible luminescent bait member 104 from which hook 106 protrudes. Bait member 104 may be, for example, formed in the shape of a minnow or a worm. Being flexible, the bait member is free to wiggle and thereby mimic the actions of a live bait in response to eddies and currents in the water, as is well known.

In a first preferred embodiment, luminescent bait member 104 is fabricated from a material selected to exhibit fluorescence when exposed to light in the ultraviolet region. Correspondingly, lamp 84 of bait illuminator 80 is selected to emit radiation substantially limited to the ultraviolet spectrum. In this way, fluorescing bait member 104 becomes visible to the fish by its emission in the visible spectrum, while the irradiating ultraviolet source is substantially invisible to the fish. This embodiment thus attracts fish to the visible bait without risk of frightening the fish by either the bright source or the beam of visible light illuminating the bait from above.

In an alternate embodiment of the present invention, bait member 104 is fabricated from a phosphorescent material and bait illuminator lamp 84 is selected to radiate in the visible spectrum. In this embodiment, after the fisherman has cast his bait and bobber to the desired fishing area, he may switch off both lamps 96 and 84 by means of switch 110 on butt end portion 24. Bait member 104, however, due to its phosphorescent material, continues to emit low intensity radiation visible to fish.

FIG. 3 depicts bobber lamp assembly 90, which can be provided in addition to bait illuminator assembly 80, if desired. Insulated conductive bobber leads 44 and 46 extend from insulated conductors 40 and 42, respectively. Bobber leads 44 and 46 pass through a single or separate orifices 93 in the outer shell 92 of bobber 90 and connect to a conventional lamp socket 94 mounted within the shell of bobber 90. Epoxy glue or the like provides a water-tight seal around orifices 93, admitting bobber leads 44 and 46, without permitting entry of water.

Bulb 96 threadably or otherwise engages socket 94 to complete a second electrical loop. Epoxy or like glue is also provided to protect any conductive portions of lamp 96 or socket 94 from exposure to water. In the preferred embodiment, lamp 96 is a conventional bulb emitting very low intensity light in the visible spectrum. Where the intensity of lamp 96 is very low, the fisherman is able to perceive the position of bobber 90, while the fish are substantially unable to perceive the very low intensity light, which fails to penetrate appreciably to the depth of the baited hook. Thus the fishing area is visibly marked for the fisherman without frightening the fish.

Although the present invention has been described with reference to preferred embodiments, rearrangements and modifications might be made within the scope of the invention.

What is claimed is:

1. A fishing apparatus comprising:
   a fishing rod with a handle adapted to hold a battery therein;
   a fishing reel attached to said rod;
   a pair of insulated electrically conducting wires carried by said reel and connected with said handle to conduct electrical power from a battery therein, for serving as fishing line;
   fluorescent bait means connected to said wires near the end thereof remote from said reel opposite said handle;
   ultraviolet bait illuminating means connected to said wires adjacent said fluorescent bait means to receive electrical power from the battery within said handle for illuminating said bait means to attract fish thereto.

2. A fishing apparatus as claimed in claim 1 in which said fishing rod includes switch means for interrupting electrical power flow from a battery within said handle to said bait illuminating means.

3. A fishing apparatus as claimed in claim 1 further comprising bobber lamp means connected to said wires between said bait illuminating means and said reel for illuminating and identifying the area beneath which said bait means is positioned with low intensity visible light.

* * * * *